United States Patent [19]
Tuckey

[11] Patent Number: 5,237,977
[45] Date of Patent: Aug. 24, 1993

[54] ATTITUDE AND LATERAL FORCE ACTIVATED VALVE

[75] Inventor: Charles H. Tuckey, Cass City, Mich.
[73] Assignee: Walbro Corporation, Cass City, Mich.
[21] Appl. No.: 977,124
[22] Filed: Nov. 16, 1992
[51] Int. Cl.⁵ ..................... F02M 37/04; F16K 17/36
[52] U.S. Cl. .................... 123/510; 123/514; 137/38; 137/576
[58] Field of Search ............... 123/514, 509, 516, 497, 123/510, 518; 137/38, 574, 576; 220/20.5, 85 R

[56] References Cited

U.S. PATENT DOCUMENTS

| | | | |
|---|---|---|---|
| 2,860,648 | 11/1958 | Harrison | 137/38 |
| 2,942,610 | 6/1960 | Rhank | 137/38 |
| 4,305,416 | 12/1981 | Henning | 137/38 |
| 4,397,333 | 8/1983 | Liba | 123/514 |
| 4,546,750 | 10/1985 | Brunell | 137/576 |
| 4,747,388 | 5/1988 | Tuckey | 137/574 |
| 4,750,518 | 6/1988 | Griffin | 137/574 |
| 4,878,511 | 11/1989 | Fox | 137/38 |
| 4,878,518 | 11/1989 | Tuckey | 137/576 |
| 4,893,647 | 1/1990 | Tuckey | 123/514 |
| 5,111,844 | 5/1992 | Emmert | 123/514 |

FOREIGN PATENT DOCUMENTS

| | | | |
|---|---|---|---|
| 622872 | 1/1963 | Belgium | 137/38 |
| 2200876 | 7/1973 | Fed. Rep. of Germany | 220/85 R |
| 0165077 | 7/1987 | Japan | 137/38 |
| 1314009 | 4/1973 | United Kingdom | 137/38 |

*Primary Examiner*—Carl S. Miller
*Attorney, Agent, or Firm*—Barnes, Kisselle, Raisch, Choate, Whittemore & Hulbert

[57] ABSTRACT

A vehicle fuel system for a vehicle which has a fuel tank remote from the engine of the vehicle and a fuel pump remote from said tank and a canister in said tank to receive return fuel from a pressure regulator in said system. A fuel flow passage carries fuel from the main fuel tank to the pump. Under conditions of low fuel in the main fuel tank, a valve associated with the canister opens in response to side swerving motion of the vehicle to allow flow of fuel from the canister to the fuel flow passage leading to the pump to prevent starving of the engine due to low flow from the main tank.

5 Claims, 2 Drawing Sheets

ATTITUDE AND LATERAL FORCE ACTIVATED VALVE

FIELD OF INVENTION

Providing fuel to a fuel line under conditions of low fuel level.

BACKGROUND AND FEATURES OF THE INVENTION

Some years back practically all internal combustion powered vehicles had a fuel pump in the engine compartment which drew fuel from a remote fuel tank and furnished fuel to the engine. More recently the use of fuel pumps in the fuel tank has become common and in most cases the fuel pump is mounted in a fuel canister with special valving to provide fuel supply to the pump inlet from the canister when the supply is low in the main fuel tank. U.S. Pat. No. 4,747,388 issued May 31, 1988 to the assignee of the present invention is an example of this system. This structure provided fuel to the pump inlet when the pump inlet was starved because of low fuel or because of movement of fuel in the main tank to one side during the negotiating of a curve.

However, there are still some vehicles manufactured which have a fuel pump in the engine compartment. Some diesel powered vehicles are examples, and also other vehicles where two tanks are used, and it would be inappropriate to put a fuel pump in each tank.

In these instances where the fuel pump in the engine compartment and remote from the fuel tanks, there may be still a problem when there is a low fuel supply, to keep fuel going to the pump. This could happen when a vehicle is exiting or entering an expressway and executing a 270° turn at a relatively high speed. The centrifugal force can force the fuel to one side of the tank and starve the fuel pick-up point at the tank. This can cause the engine to sputter or quit.

The present invention is directed to an in-tank valve located in a canister in the main fuel tank at the fuel pick-up point. The fuel canister is supplied with fuel from a fuel return line leading from a pressure regulator valve.

It is an object to provide what may be termed an "attitude activated valve" which is responsive to centrifugal force resulting from a vehicle negotiating a corner or curve. In repose, during normal operation, the valve element, which can be responsive to a lateral force, closes an auxiliary port and retains return fuel in the canister. In response to lateral force, the valve opens the auxiliary port and allows the fuel in the canister to dump into a fuel flow passage leading to the pump. This will occur whether the vehicle is turning to the right or to the left.

Other objects and features of the invention will be apparent in the following description and claims in which details of the invention are set forth to enable those skilled in the art to practice the invention, all in connection with the best mode presently contemplated for the invention.

BRIEF DESCRIPTION OF THE DRAWINGS

DRAWINGS accompany the disclosure and the various views thereof may be briefly described as.

DETAILED DESCRIPTION OF THE INVENTION AND THE MANNER AND PROCESS OF USING IT

Figure 1:
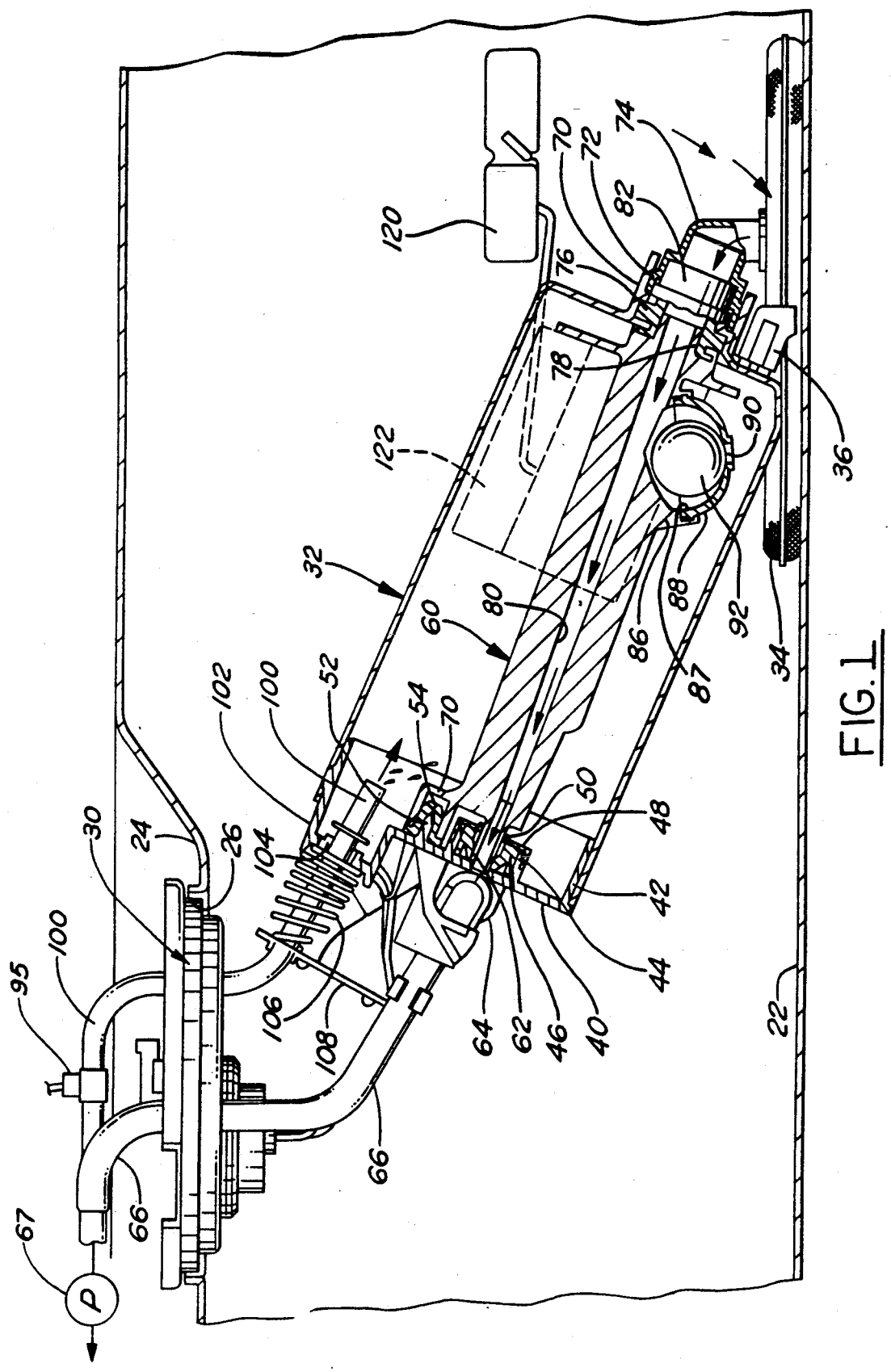
FIG. 1, a sectional view of a vehicle fuel tank with included canister and valve.

With reference to FIG. 1, a vehicle fuel main tank 20 with a base panel 22, has a depressed section 24 having an opening 26 in which a removable closure 30 is mounted. Within the tank 20 is a canister 32, the bottom end of which is resting on a filter pad 34 lying on the bottom 22 of the main tank. A dog-leg support 36 affixed to the bottom corner of the canister 32 provides mechanical support for the angled canister.

The canister 32 has a skirted cover 40 with walls 42 that insert into the open top of the canister. The cover 42 has also an annular depending flange 44 which houses a sealing ring 46 captured by a cup 48 retained by a clip ring 50. A separate prong 52 inserts into a seal cup 54. The ring 46 and the seal cup 54 are made of a soft elastic material to provide a flexible mount for a fuel flow tube 60.

The flow tube 60 extends from the top of the canister to the lower end. The top end of the flow tube 60 has a narrow neck portion 62 which projects through the cup 48 and the elastic seal 46 and into any opening in the cover 40 leading to a chamber 64 on the cover in communication with a fuel conduit 66 which passes through the closure 30 and into a fuel pump 67 and an engine as a fuel supply.

The flow tube has also an offset portion 70 with a recess which receives the elastic seal cup 54 fitted around the prong 52. Thus, the top of the fuel flow tube 60 is resiliently mounted in the cover 40.

The lower end of the canister 32 has a stepped necked-down portion 70 which provides an annular groove to receive, in sealing relation, a flange 72 on an angled inlet fixture 74 serving as an outlet for the filter pad 34 lying on the bottom 22 of the tank. At the top of the neck portion 70 is a soft, elastic ring 76 which receives and flexibly supports a neck 78 on the bottom of the flow tube 60. A central elongate fuel passage 80 in flow tube 60 originates in neck 78 and terminates at neck portion 62 at the top of the canister. Thus, fuel in the bottom of the main fuel tank 20 is open through the filter 34 and the fixture 74 to the passage 80 and the fuel line 66.

Figure 2:
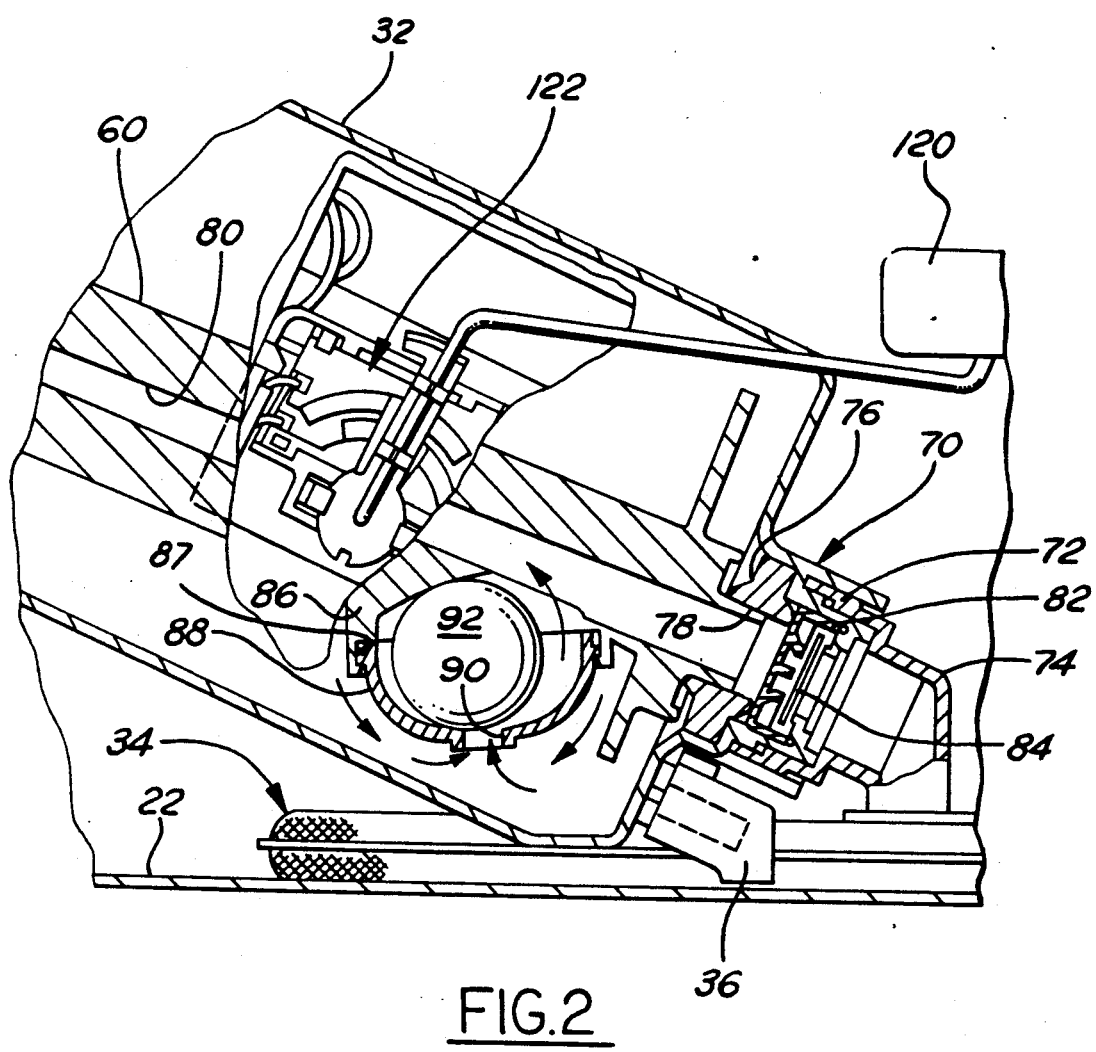
FIG. 2, a partial section showing the auxiliary port open to the fuel flow passage leading to the pump with the valve displaced.

With reference to FIGS. 1 and 2, a valve cage 82 contains a check valve 84 which allows fuel to pass from the main fuel tank and filter to the elongate flow passage 80 in the flow tube 60.

As illustrated in FIGS. 1 and 2, the flow tube 60 has a side chamber 86 open at the top to fuel passage 80 and having a circular opening 87 lying essentially in a plane parallel to the bottom 22 of the fuel tank 20. This opening 87 is closed by a hemispherical shell 88 having a rim sealingly affixed in an annular recess in the circular opening. The bottom pole of the shell 88 has a port opening 90 essentially parallel to the tank bottom 22 and communicating with the interior of the canister 32. Confined within the chamber 86 closed by the shell 88 is a spherical ball 92 with a diameter smaller than the chamber formed by 86,88 and positioned by gravity, as illustrated in FIG. 1, to close the port opening 90.

In the fuel system in which the fuel pump remote from the fuel tank draws fuel from the main tank, there is also a fuel pressure regulator 95 which returns fuel through a conduit 100 to the interior of the canister 32.

In the top of the cover 40 is a riser chamber 102 with an internal flange having an opening 104 larger than the conduit 100 through which the conduit passes into the canister. A spring 106 bears against the internal flange at one end and seats against a cross-bracket 108, thus urging the canister toward the bottom of the tank in the angled position shown. If the canister becomes full of returned fuel, it will overflow into the main tank through the opening 104. Thus, it will be appreciated that the canister, under normal operating conditions, will have a supply of fuel which is not available to the pump inlet as long as the ball 92 is closing the port opening 90.

However, if the vehicle in which the tank 20 is mounted, is moved in a curved path such as the 120° entrance or exit ramp of an expressway, the ball 92 will be moved by centrifugal force away from port opening 90 and the fuel supply in the canister will be available to the passage 80 (FIG. 2). Accordingly, if the fuel supply in the main tank is very low so that it is moved by the centrifugal force to the side of the fuel tank away from inlet fixture 74, there will be an auxiliary supply of fuel from the canister which will prevent the engine from being starved of fuel which may result in a stall-out. It will be seen that the motion of ball 92 could be either to the left as viewed in FIG. 2, or to the right to open port 90.

When the ball 92 moves off the port 90, fuel in the canister will flow, by reason of the liquid head in the canister, into the flow passage 80 and become available to the pump inlet. The gravity flow of liquid fuel into passage 80 will tend to move the check valve plate 84 to a closed position to block flow from the canister to the main tank.

In FIGS. 1 and 2, a fuel float 120 is shown diagrammatically associated with a fuel level sensor 122 but this is unrelated to the present invention except as it will alert a driver to a low fuel condition.

What is claimed is:

1. In a vehicle fuel system,
   (a) a main fuel tank,
   (b) a canister within said fuel tank having a fuel inlet from said main fuel tank and a fuel outlet,
   (c) a flow passage in said canister isolated from the interior of said canister and connected at one end to said fuel inlet and at the other end to said fuel outlet,
   (d) means forming a fuel port connecting said flow passage with the interior of said canister, and
   (e) a valve element in said means to close said port in one position and responsive to curvilinear motion of said vehicle to open said port to connect the fuel outlet with the interior of said canister.

2. A fuel system as defined in claim 1 in which a fuel pump is connected to said fuel outlet of said canister, and a fuel return conduit leading to said canister is associated with a pressure regulator whereby return fuel from said pressure regulator is directed to said canister.

3. A fuel system as defined in claim 1 in which said means forming a fuel port comprises a chamber open at one side to said flow passage, said fuel port being located in a wall of said chamber, said valve element comprising a ball confined in said chamber having an at-rest position closing said fuel port and a position responsive to vehicle motion to open said port allowing accumulated fuel in said canister to flow to said fuel outlet.

4. A fuel system as defined in claim 1 in which said fuel inlet is located at the bottom of said main fuel tank and said fuel outlet is connected to a fuel pump, and said fuel pump normally drawing fuel from said main fuel tank through said flow passage, a chamber formed in said flow passage having a top opening in communication with said flow passage and said fuel port in said chamber facing the bottom of said main fuel tank, said valve element comprising a ball resting and closing said port by gravity when said vehicle is traveling in a straight line and said ball moving by centrifugal force during side motion to open said port and allow fuel flow to said flow passage and said pump.

5. A fuel system as defined in claim 4 in which a check valve is positioned in said fuel inlet arranged to close when fuel is dumped from said canister into said flow passage.

* * * * *